(12) United States Patent
Mack

(10) Patent No.: US 7,891,918 B2
(45) Date of Patent: Feb. 22, 2011

(54) DRILL

(75) Inventor: Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 1146 days.

(21) Appl. No.: 11/579,579

(22) PCT Filed: Apr. 27, 2006

(86) PCT No.: PCT/DE2006/000748
§ 371 (c)(1),
(2), (4) Date: Nov. 3, 2006

(87) PCT Pub. No.: WO2006/119728
PCT Pub. Date: Nov. 16, 2006

(65) Prior Publication Data
US 2007/0235952 A1  Oct. 11, 2007

(30) Foreign Application Priority Data
May 6, 2005  (DE) .................. 10 2005 021 629

(51) Int. Cl.
*B23B 45/02* (2006.01)
*B23B 31/16* (2006.01)
(52) U.S. Cl. ................. 408/9; 279/62; 279/125; 279/126; 318/434
(58) Field of Classification Search ............... 408/8, 408/9; 279/62, 126, 125; 318/434; *B23B 45/02*
See application file for complete search history.

(56) References Cited
U.S. PATENT DOCUMENTS

| 4,090,802 | A | * | 5/1978 | Bilz | 408/6 |
|---|---|---|---|---|---|
| 4,198,180 | A | * | 4/1980 | Schultz | 408/9 |
| 4,292,571 | A | * | 9/1981 | Cuneo | 318/17 |
| 4,507,025 | A | * | 3/1985 | Fedor | 408/6 |
| 4,530,624 | A | * | 7/1985 | Cuneo | 408/8 |
| 4,540,318 | A | | 9/1985 | Hornung et al. | |
| 4,673,318 | A | * | 6/1987 | Hornung et al. | 408/9 |
| 4,715,264 | A | * | 12/1987 | Stoll | 91/16 |
| 4,761,101 | A | * | 8/1988 | Zettl | 408/6 |
| 4,852,434 | A | * | 8/1989 | Bald | 82/118 |
| 5,072,954 | A | | 12/1991 | Mack | |
| 5,857,814 | A | * | 1/1999 | Jang | 408/6 |

FOREIGN PATENT DOCUMENTS

DE  3437960 A1 *  4/1986
JP  59053108 A *  3/1984

* cited by examiner

*Primary Examiner*—Eric A Gates
(74) *Attorney, Agent, or Firm*—Andrew Wilford

(57) ABSTRACT

A drill has a housing, a drivable drill spindle rotatably mounted in the housing, a chuck body coaxially connected and rotationally fixed to the drill spindle, a tightening sleeve rotatable on and relative to the chuck body, and jaws moveable relative to the chuck body by the tightening sleeve. A coupling between the housing and the tightening sleeve has a sleeve held on the housing so as not to rotate with the chuck body and movable relative to the chuck body chuck between a coupling position in which it connects the tightening sleeve to the spindle housing angularly in a friction-fit manner and a decoupling position into which it is urged by a decoupling spring when torque between the tightening sleeve and the coupling sleeve in the coupling position exceeds a predetermined value.

12 Claims, 5 Drawing Sheets

DRILL

CROSS REFERENCE TO RELATED APPLICATIONS

This application is the US national phase of PCT application PCT/DE2006/000748, filed 27 Apr. 2006 and claiming the priority of German patent application 102005021629.3 itself filed 6 May 2005.

FIELD OF THE INVENTION

The invention relates to a drill comprising a drivable drill spindle that is rotatably mounted in a housing of a power unit, and a drill chuck that is connected to the spindle end and that has a chuck body that is coaxially connected and rotationally fixed to the drill spindle and that has jaws that may be moved relative to the chuck body by means of a tightening sleeve that is rotatable with respect to the chuck body.

BACKGROUND OF THE INVENTION

In such drills, which are widely used in practice, the drill chuck is mounted on the spindle end of the power unit so as to be replaceable, the interfit of the two parts forming the drill being essentially provided by the complementary coupling of the drill spindle with the chuck body in which a threaded seat is generally provided, into which the drill spindle that is designed as a threaded spindle may be screwed.

OBJECT OF THE INVENTION

The object of the invention is to provide a drill of the above-described type such that the two parts that form the drill, namely, the power unit and the drill chuck, are largely integrated.

SUMMARY OF THE INVENTION

In a drill of the above-described type this object is achieved according to the invention in that sensor means that influences the drive control of the drill as a function of the operating state of the drill chuck is associated with the housing.

This drill is characterized in that the operating state of the drill chuck may be monitored more closely by use of the sensor, and the machine power may thus be modified without active participation by the user of the drill, which is particularly advantageous with regard to safety aspects, since in the worst case scenario, modifying machine power involves complete shut down.

In this regard it is practical for the sensor to be associated with the adjustment range of the jaws for detection of the axially rear end position of the jaws. When the drill chuck is opened, in this embodiment when the jaws, which are held in guide passages running at an angle with respect to the chuck axis, are moved to their axially rear end position, the sensor may be used to reliably prevent the jaws from jamming, which may sometimes occur in practice when the jaws are operated at full machine power. As the jaws approach one another, the sensor allows the machine power to be reduced up to the point of a complete stoppage of the drill, thereby reliably preventing the jaws from jamming.

A further preferred embodiment of the invention is characterized in that between the housing and the tightening sleeve a coupling device is provided that includes a coupling sleeve that is held on the housing so as to prevent rotation with the drill chuck and that may be moved relative to the drill chuck, and the coupling device in the coupling position thereof angularly locks the tightening sleeve to the housing in a friction-fit manner and may be moved by a decoupling spring into a decoupling position when the torque transmitted between the tightening sleeve and the coupling sleeve in the coupling position exceeds a predetermined value, and the coupling sleeve is formed by a stationary rear sleeve associated with the housing and a front sleeve that surrounds the tightening sleeve and that is axially movable with respect to the stationary rear sleeve between the decoupling and the coupling positions, and the sensor for detecting the position of the front sleeve and that is associated with controller of the drill is situated in the region of the axial adjustment range of the front sleeve. This embodiment is characterized in that for opening and closing the drill chuck a drill controller may be actuated solely by moving a component, namely, the front sleeve, associated with the drill chuck, so that, in addition to inserting the drill bit between the jaws of the drill chuck, it is not necessary for the user to also take an active part in actuating controller for the drill.

Particular advantages are obtained by providing multiple sensors for detecting various positions of the front sleeve and for influencing drive control as a function thereof, since by use of a number of these sensors all operating states associated with the opening and closing of the drill chuck and the continuous operation thereof may be achieved by moving the front sleeve.

It is also advantageous when the sensor is a contactless sensor, since in this case the sensor ensures the necessary operational reliability even when contaminants and vibrations are present during operation of the drill. In principle, contactless sensors are known from the prior art, such as inductive sensors, for example, that may also be used in the drill according to the invention.

A compact design is obtained when the sensor is placed in a sensor ring situated on the stationary rear sleeve.

To avoid the need for the user of the drill to constantly maintain the position of the front sleeve when a given operating state is to be achieved by means of the front sleeve, the invention provides that a latch sleeve that overlaps the front sleeve on the end opposite the stationary rear sleeve is associated with the housing, and a number of latching seats are provided in the latch sleeve that correspond to respective operating positions of the front sleeve, i.e. with the configuration of the sensors provided for the operating positions.

One of the sensors may be provided for each of the latching seats, so that the number of latching seats is equal to the number of sensors. The reliability of the drill according to the invention is increased by providing a spring between the front sleeve and the latch sleeve that specifies the rest position of the front sleeve. When a limiting force is exceeded, this spring forces the front sleeve back to the rest position, which advantageously is associated with the continuous operation of the drill, thereby preventing the drill bit from being unintentionally loosened during drilling operations.

The invention also provides that a clamping-torque limit sensor that determines the maximum clamping torque is associated with the stationary rear sleeve and forms a part of the coupling device.

The clamping-torque limit sensor has a pin that is mounted on the housing, that is engaged by a limit sensor spring, and that engages with a pin seat having flattened edges.

It is also advantageous for radial chip-removal openings to be provided in the front sleeve. These chip-removal openings ensure that drilling chips that enters the drill chuck during drilling operations can exit the drill chuck when the latter is surrounded by the front sleeve. The radial orientation of the chip-removal openings makes use of the fact that the drilling chips are transported outward from the rotating chuck by centrifugal force and may be spun off.

It is also advantageous when the sensor for detecting the position of the front sleeve, within the angular range of travel of the front sleeve, is provided for influencing the rotational direction of the drill via a drill controller. Thus, solely with the position of the front sleeve the user may control whether the drill chuck is driven for opening or closing via the drill controller.

BRIEF DESCRIPTION OF THE DRAWING

The invention is explained in greater detail below, with reference to illustrated embodiments shown in the drawing that shows the following.

SPECIFIC DESCRIPTION

Figure 1:
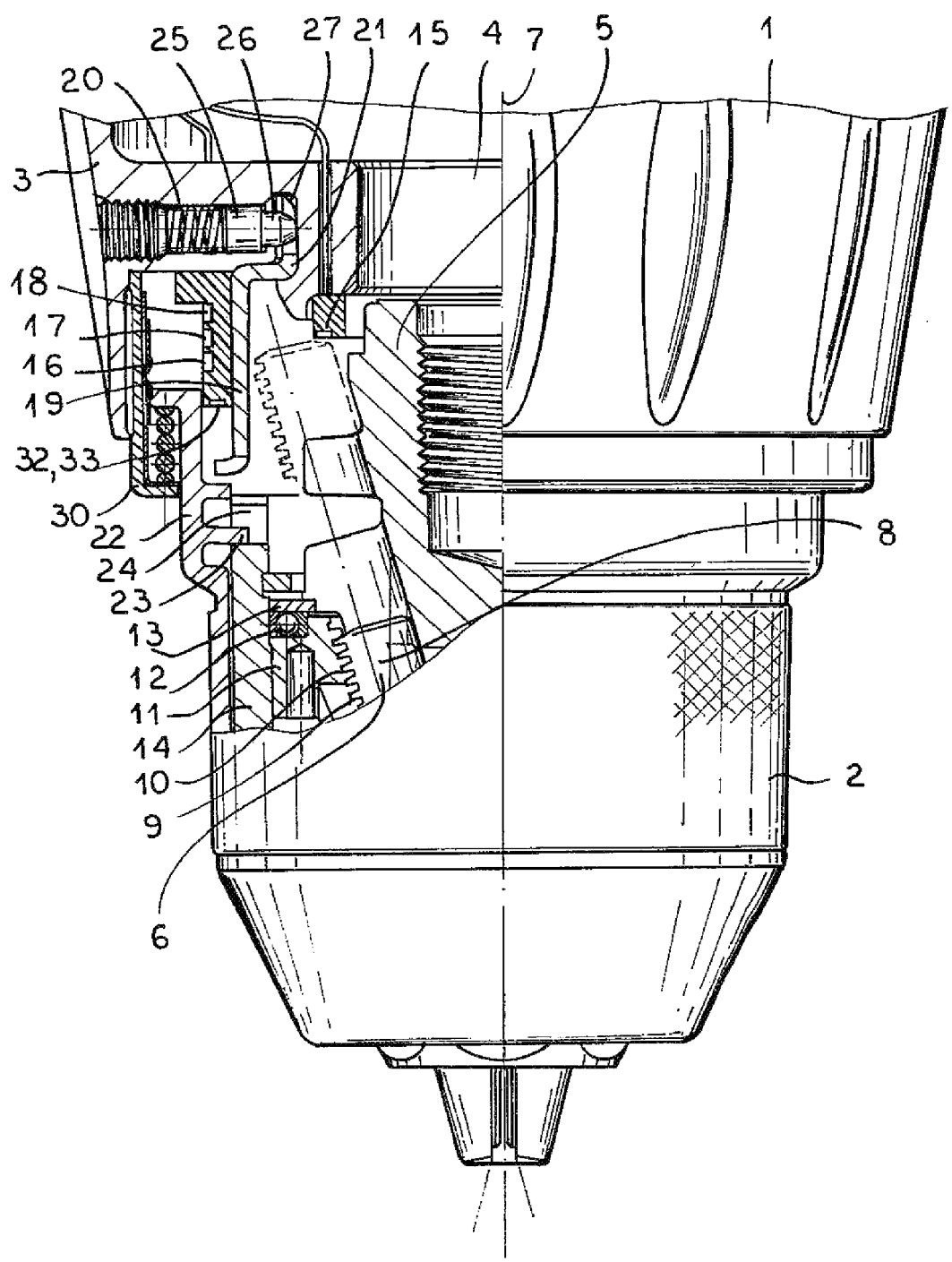
FIG. 1 shows the front portion of a drill according to the invention in a side view, illustrated in a partial section on the left side, in a position of the front sleeve set for manual tightening.

The drawing illustrates a drill comprising a combination of a power unit 1 and a drill chuck 2. The drawing shows only the front part of the power unit 1 necessary for explaining the invention; in addition, only the components of the drill chuck 2 necessary for explaining the invention are emphasized.

The drill comprises a drill spindle 4 mounted in a housing 3 of the power unit 1, at the spindle end of which the drill chuck 2 is connected that has a chuck body 5 that is coaxially connected in a rotationally fixed manner to the drill spindle 4 and that has jaws 6 that in the illustrated embodiment shown in FIG. 1 are positioned in guide passages 8 extending at an angle to a chuck axis 7 and on their radially outward sides each have a row of teeth 9 that engage with a clamping thread 10 of a threaded ring 11 that is axially braced at its rear face on the chuck body 5 by means of a ball bearing 12 and a snap ring 13. The jaws 6 are adjusted by rotation relative to the chuck body 5 of a tightening sleeve 14 coupled to the threaded ring 11, thus allowing the drill chuck 2 to be opened and closed by rotating the tightening sleeve 14 in the corresponding rotational direction.

Sensor means 15, 16, 17, 18, 32, 33 that influences the drive control of the power unit 1 as a function of the operating state of the drill chuck 2 is associated with the housing 3, namely, in FIG. 1, a sensor 15 associated with the adjustment range of the jaws 6 for detecting the axial rear end position thereof. When the drill chuck 2 is opened by mechanical force and the jaws are moved to their axially rear end position, the sensor 15 essentially prevents operation at full drill power, since the sensor 15 detects the approach of the jaws 6 and actuates a drill controller in order to reduce the machine power and, if needed, completely stop the power unit 1.

For the drill chuck 2 illustrated in FIG. 1, it is also seen that there is between the housing 3 and the tightening sleeve 14 a coupling device that includes a coupling sleeve 19 that is held on the housing 3 so as to prevent rotation with the drill chuck 2 and that may be moved relative to the drill chuck 2, and the coupling device in the coupling position thereof connects the tightening sleeve 14 to the housing 3 angularly in a friction-fit manner and may be moved into a decoupling position by a decoupling spring 20 when the torque transmitted between the tightening sleeve 14 and the coupling sleeve 19 in the coupling position exceeds a predetermined value, and the coupling sleeve 19 is formed by a stationary rear sleeve 21 associated with the housing 3 and a front sleeve 22 that surrounds the tightening sleeve 14 and that is axially movable with respect to the stationary rear sleeve 21 between the decoupling and the coupling positions. The sensor 16, 17, 18 for detecting the position of the front sleeve 22 and that is associated with the controller of the drill is situated in the region of the axial adjustment range of the front sleeve 22, in the embodiment illustrated in the drawing, multiple sensors 16, 17, 18 being provided for detecting various positions of the front sleeve 22 and for influencing the drive control as a function thereof.

A latch sleeve 30 overlaps the front sleeve 22 on the end opposite the stationary rear sleeve 21 and is associated with the housing 3. A number of latching seats are provided in the latch sleeve 30 that correspond to respective operating positions of the front sleeve 22.

FIG. 1 shows one position of the front sleeve 22 in which, as the result of the engagement of the coupling pin 23 with the pin seat 24 in the tightening sleeve 14, conventional manual actuation of the drill chuck 2 is possible for opening and clamping. In this embodiment, the front sleeve 22 is gripped and twisted, resulting in rotation of the tightening sleeve 14 and the threaded ring 11 that is connected thereto in a rotationally fixed manner. The sensor 16 detects the axial position of the front sleeve 22 and ensures that the drill controller does not drive the drill spindle 4, but, rather, guarantees that the spindle is stopped, thus allowing the tightening sleeve 14 to rotate with respect to the chuck body 5 without manual braking of the chuck body 5. In addition, in this embodiment a sensor 32 is present that within the range of travel of the front sleeve detects the position thereof angularly so that the user may check the rotational direction of the power unit 1 when, as described below with reference to FIG. 2, mechanical opening and closing is to take place. In principle, a simple design of the sensor 32 is sufficient for this purpose, since it is only necessary to switch on deviation from the normal state, i.e. in either a right-handed or left-handed rotation. However, the sensor 32, 33 may also be provided in two parts, with placement angularly at a distance from one another, to allow the user to select the rotational direction in a targeted manner.

Figure 2:
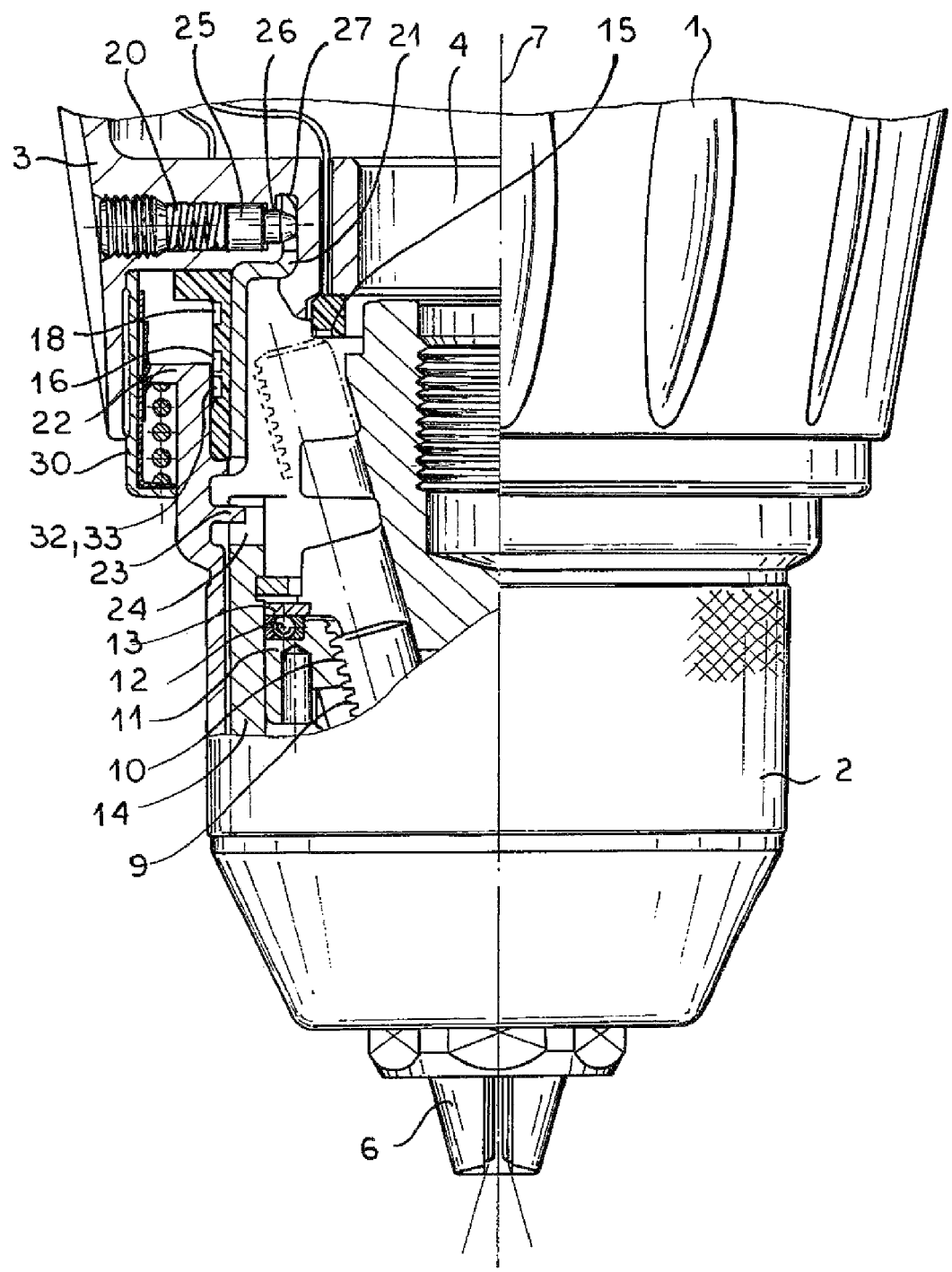
FIG. 2 shows a view of an alternative embodiment corresponding to FIG. 1, in a position of the front sleeve provided for power tightening.

This is shown in FIG. 2 in an axial position of the front sleeve 22 that is used to mechanically open and close the drill chuck 2, since in this position torque is applied to the drill spindle 4 by the drill controller at a low rotational speed, thereby forcing the relative rotation of the tightening sleeve 14 with respect to the chuck body 5, since the tightening sleeve 14 is connected via the coupling pin 23 to the front sleeve 22, that in turn is connected via the coupling device to the housing 3. Only when the desired clamping force is reached or exceeded does the clamping-torque limit sensor 25 associated with the stationary rear sleeve 21 respond as a part of the coupling device, and the pin 26 associated with the clamping-torque limit sensor 25 is pushed out from the pin seat 27 having flattened edges, against the force of the limit sensor spring. The position of the front sleeve 22 angularly specifies the rotational direction by means of the sensors 32, 33.

Figure 3:
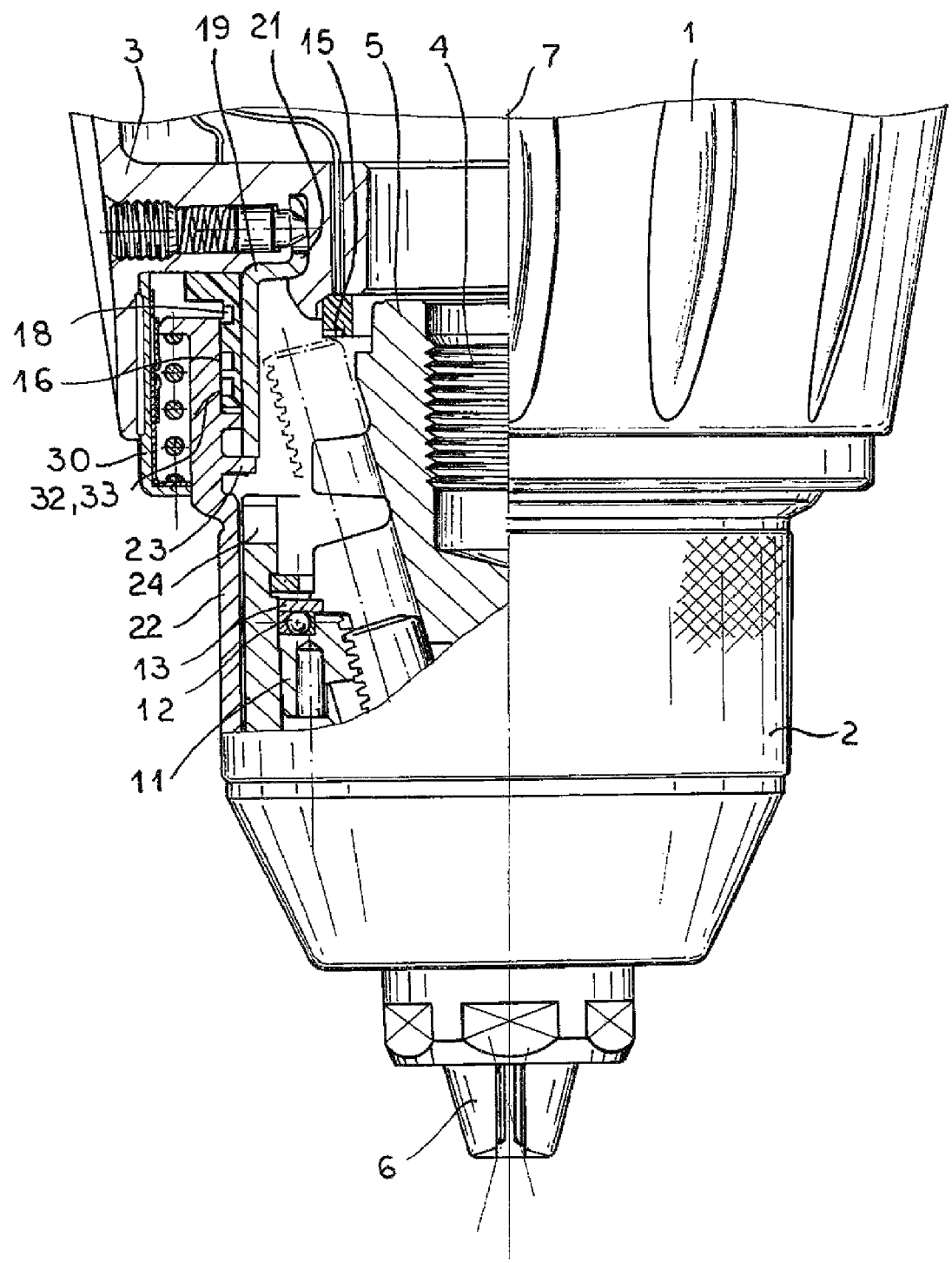
FIG. 3 shows a view corresponding to FIG. 2, in the position of the front sleeve provided for a drilling and screwing operation.

FIG. 3 shows, in the embodiment of FIG. 2, the position of the front sleeve associated with the normal drilling or screwing operation in which by use of the sensor 18 the sole control of the drill controller is transferred to the regulator for the drill 1.

Figure 4:
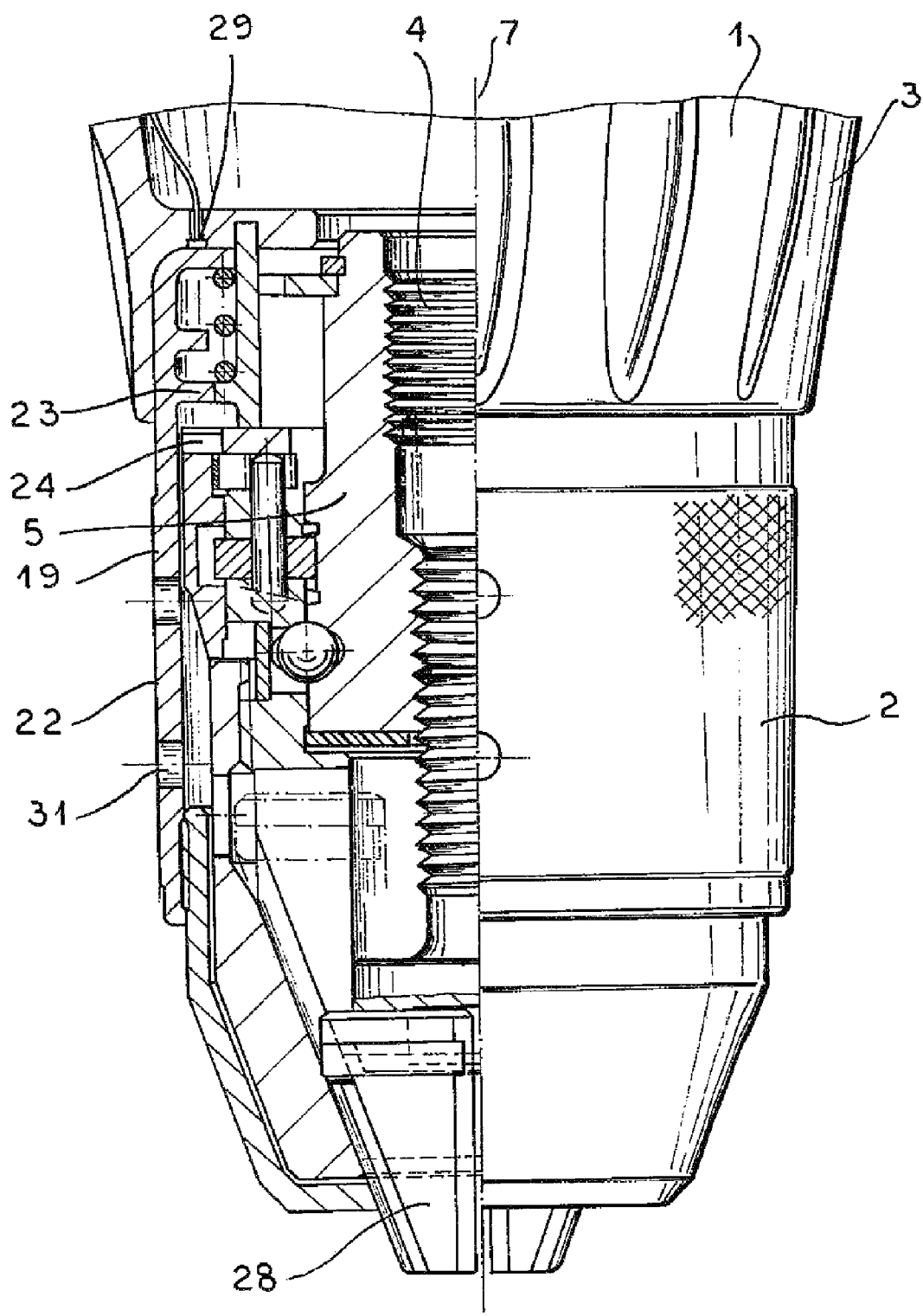
FIG. 4 shows a view of an alternative embodiment corresponding to FIG. 1.
Figure 5:
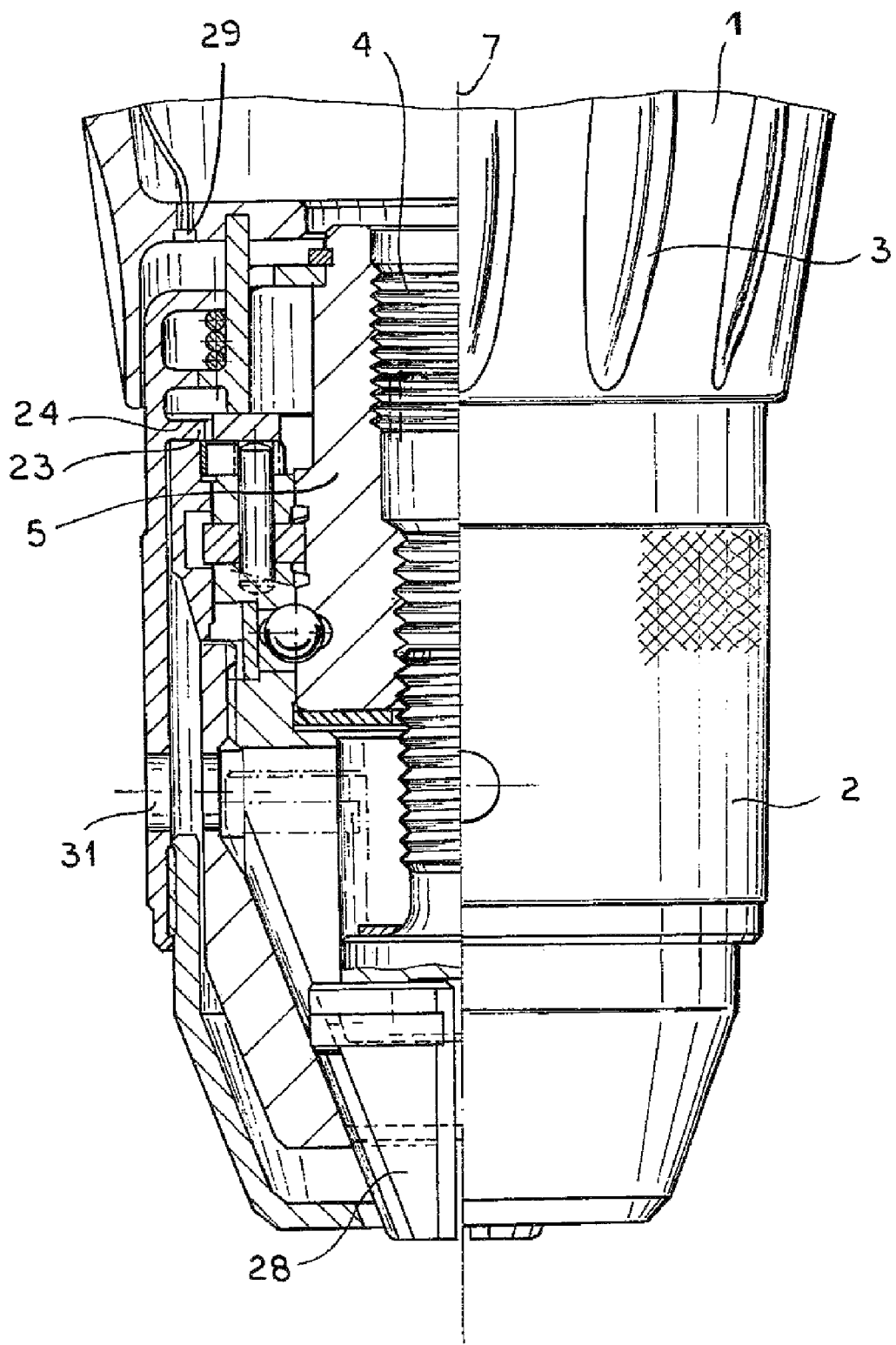
FIG. 5 shows a view of the embodiment of FIG. 4, corresponding to FIG. 2.

FIG. 4 shows that the invention may also be implemented for another type of drill chuck, namely, a self-tightening drill chuck having flat jaws 28 that, however, is operated similarly as for the cylindrical jaw drill chuck shown in FIGS. 1 through 3, namely, by twisting the tightening sleeve 14 relative to the chuck body 5 so that in a similar manner the axial position of the clamping cone may be detected by use of the sensor 29.

The invention claimed is:

1. A drill comprising:
   a housing;
   a drivable drill spindle rotatably mounted in the housing;
   a chuck body coaxially connected and rotationally fixed to the drill spindle;
   a tightening sleeve rotatable on and relative to the chuck body;
   jaws moveable relative to the chuck body by the to tightening sleeve;
   a coupling between the housing and the tightening sleeve and having a coupling sleeve held on the housing so as not to rotate with the chuck body and movable relative to the chuck body chuck between a coupling position in which it connects the tightening sleeve to the spindle housing angularly in a friction-fit manner and a decoupling position into which it is urged by a decoupling spring when torque between the tightening sleeve and the coupling sleeve in the coupling position exceeds a predetermined value, the coupling sleeve being formed by a stationary rear sleeve associated with the housing and a front sleeve surrounding the tightening sleeve and axially movable with respect to the stationary rear sleeve between the decoupling and the coupling positions; and
   sensor means that influences the drive control of the drill as a function of the operating state of the drill chuck and associated with the housing, the sensor means including a sensor for detecting the position of the front sleeve, associated with machine control of the drill, and situated in a region of axial adjustment of the front sleeve.

2. The drill according to claim 1, wherein the sensor is associated with the adjustment range of the jaws for detection of the axially rear end position of the jaws.

3. The drill according to claim 1, wherein the sensor is provided in multiples for detecting various positions of the front sleeve and for influencing the drive control as a function thereof.

4. The drill according to claim 1, wherein the sensor is a contactless sensor.

5. The drill according to claim 1, wherein the sensor is held in a sensor ring situated on the stationary rear sleeve.

6. The drill according to claim 1, wherein a latch sleeve overlapping the front sleeve on an end thereof opposite the stationary rear sleeve is associated with the housing, the latch sleeve being provided with a plurality of latching seats that correspond to respective operating positions of the front sleeve.

7. The drill according to claim 6, wherein one of the sensors is provided for each of the latching seats.

8. The drill according to claim 6, further comprising
   a spring provided between the front sleeve and the latch sleeve that establishes a rest position of the front sleeve.

9. The drill according to claim 1, further comprising
   a clamping-torque limit sensor that established a maximum clamping torque and that is associated with the stationary rear sleeve.

10. The drill according to claim 9, wherein the clamping-torque limit sensor has a pin mounted on the housing and engaged by a limit sensor spring and that is engageable in a pin seat having flattened edges.

11. The drill according to claim 1, wherein radial chip-removal openings are provided in the front sleeve.

12. The drill according to claim 1, wherein the sensor for detecting the position of the front sleeve, within the range of travel of the front sleeve angularly, is provided for influencing the rotational direction of the drill via machine control.

* * * * *